United States Patent
Lorenz et al.

(10) Patent No.: US 10,444,437 B2
(45) Date of Patent: Oct. 15, 2019

(54) MOUNTING STRUCTURE FOR A LIGHT GUIDE, HOUSING WITH A MOUNTING STRUCTURE, OPTOELECTRONIC DEVICE AND METHOD OF PRODUCING AN OPTOELECTRONIC DEVICE

(71) Applicant: OSRAM Opto Semiconductors GmbH, Regensburg (DE)

(72) Inventors: Stefan Lorenz, Obertraubling (DE); Elmar Baur, Regensburg (DE)

(73) Assignee: OSRAM Opto Semiconductors GmbH, Regensburg (DE)

( * ) Notice: Subject to any disclaimer, the term of this patent is extended or adjusted under 35 U.S.C. 154(b) by 0 days.

(21) Appl. No.: 16/114,921

(22) Filed: Aug. 28, 2018

(65) Prior Publication Data

US 2019/0064445 A1    Feb. 28, 2019

(30) Foreign Application Priority Data

Aug. 31, 2017 (DE) .................. 10 2017 120 019

(51) Int. Cl.
| | |
|---|---|
| *G02B 6/36* | (2006.01) |
| *G02B 6/245* | (2006.01) |
| *G02B 6/26* | (2006.01) |
| *G02B 6/42* | (2006.01) |

(52) U.S. Cl.
CPC ........... *G02B 6/3616* (2013.01); *G02B 6/245* (2013.01); *G02B 6/262* (2013.01); *G02B 6/424* (2013.01); *G02B 6/429* (2013.01); *G02B 6/4219* (2013.01); *G02B 6/4214* (2013.01); *G02B 6/4215* (2013.01)

(58) Field of Classification Search
CPC ...... G02B 6/262; G02B 6/3616; G02B 6/245; G02B 6/4219
See application file for complete search history.

(56) References Cited

U.S. PATENT DOCUMENTS

| | | | | |
|---|---|---|---|---|
| 3,936,631 | A * | 2/1976 | Muska | ..................... G02B 6/24 250/227.24 |
| 6,246,819 | B1 * | 6/2001 | Windebank | ............ G02B 6/245 385/39 |
| 6,757,460 | B2 * | 6/2004 | Melchior | ............. G02B 6/2817 385/31 |
| 7,600,925 | B2 | 10/2009 | Alameh et al. | |

FOREIGN PATENT DOCUMENTS

DE    42 28 996 C1    7/1993

* cited by examiner

*Primary Examiner* — Sung H Pak
(74) *Attorney, Agent, or Firm* — DLA Piper LLP (US)

(57) ABSTRACT

A mounting structure for a light guide having a core and a longitudinal axis, wherein the mounting structure includes a holder into which the light guide is insertable obliquely or perpendicular to the longitudinal axis, and the mounting structure is configured to provide an optical coupling to the core of the light guide.

17 Claims, 10 Drawing Sheets

FIG 5B

MOUNTING STRUCTURE FOR A LIGHT GUIDE, HOUSING WITH A MOUNTING STRUCTURE, OPTOELECTRONIC DEVICE AND METHOD OF PRODUCING AN OPTOELECTRONIC DEVICE

TECHNICAL FIELD

This disclosure concerns a mounting structure for a light guide, a housing with a mounting structure, an optoelectronic device and a method of producing an optoelectronic device.

BACKGROUND

In an optoelectronic device with several emitters, it is often necessary to measure the light emitted by the individual emitters and feedback based on the measurement result to control an optical parameter such as brightness. If several detectors are used, variations between the detectors can lead to a falsification of the measurement result. On the other hand, the coupling of the light of several emitters into only one detector such that each emitter delivers an equivalent signal is technically complex or can only be used for a small number of emitters, for example, via specially adapted optical elements such as apertures or reflectors.

There is thus a need to simplify the supply of the emitted light to a detector.

SUMMARY

We provide a mounting structure for a light guide having a core and a longitudinal axis, wherein the mounting structure comprises a holder into which the light guide is insertable obliquely or perpendicular to the longitudinal axis, and the mounting structure is configured to provide an optical coupling to the core of the light guide.

We also provide a housing of a light-emitting component comprising the mounting structure for a light guide having a core and a longitudinal axis, wherein the mounting structure comprises a holder into which the light guide is insertable obliquely or perpendicular to the longitudinal axis, and the mounting structure is configured to provide an optical coupling to the core of the light guide.

We further provide an optoelectronic device with at least two light-emitting components, a detector and a light guide having a core and a longitudinal axis, wherein the light-emitting components are each assigned the mounting structure for a light guide having a core and a longitudinal axis, wherein the mounting structure comprises a holder into which the light guide is insertable obliquely or perpendicular to the longitudinal axis, and the mounting structure is configured to provide an optical coupling to the core of the light guide, the light guide is inserted into the mounting structures so that during operation of the optoelectronic device a part of at most 10% of the light generated by the light-emitting components is coupled into the light guide in each case, and light emerging from the light guide at least partially impinges on the detector.

We further yet provide a light-emitting component comprising a housing with a lead frame, and a mounting structure for a light guide having a core and a longitudinal axis, wherein the mounting structure comprises a holder into which the light guide is insertable obliquely or perpendicular to the longitudinal axis, the mounting structure is configured to provide an optical coupling to the core of the light guide, the lead frame is configured for external electrical contacting of the light-emitting component, and the mounting structure is formed as a part of the lead frame.

We also further provide a method of producing an optoelectronic device comprising a) providing at least two light-emitting components, each of which comprise a housing with a lead frame, and a mounting structure for a light guide having a core and a longitudinal axis, wherein the mounting structure comprises a holder into which the light guide is insertable obliquely or perpendicular to the longitudinal axis, the mounting structure is configured to provide an optical coupling to the core of the light guide, the lead frame is configured for external electrical contacting of the light-emitting component, and the mounting structure is formed as a part of the lead frame; b) inserting the light guide into the holders of the mounting structures; and c) establishing an optical coupling to the core of the light guide in the region of the mounting structures.

BRIEF DESCRIPTION OF THE DRAWINGS

FIGS. 2A to 2F show an example of a housing with a mounting structure, wherein

FIGS. 4A and 4B show an example of an optoelectronic device in plan view, wherein

REFERENCE NUMBER LIST 1 mounting structure
2 light guide
3 holder
4 processing structure
5 deflection device
7 light-emitting component
8 optoelectronic device
10 mounting surface
20 core of the light guide
22 coupling region
25 longitudinal axis
28 image of the light coupling structure
29 insulation
30 insertion opening 31 projection
35 clamp
41 bracket
45 light coupling structure
46 set-back region
55 shielding region
70 housing
71 housing body
72 lead frame
73 envelop
81 connection carrier
85 detector
99 section
290 stripped region
450 medium
550 light propagation region
810 connection area

DETAILED DESCRIPTION

We provide a mounting structure for a light guide. The light guide has a core in which the light coupled into the light guide is guided. The light guidance in the light guide takes place along a longitudinal axis of the light guide. The core can be surrounded by a cladding with a lower refractive index than the core so that wave guidance occurs due to total reflection at the interface between the core and the cladding. However, such a cladding is not absolutely necessary. Total reflection at an interface to air can also lead to light guidance. The light guide can also have an inner structure and in particular an optical metamaterial. Furthermore, the core can be surrounded by an opaque insulation. For example, the insulation comprises an opaque plastic or is made of such a material. A cross section of the light guide is, for example, round, oval, hexagonal, rectangular or square.

The light guide is, for example, a flexible light guide. Such light guides are available pre-assembled at low cost and can be used variably with regard to the spatial arrangement of light-emitting components in a device. Alternatively, the light guide is a rigid light guide, for example. With respect to the geometric design, such light guides can be produced and adapted to the optoelectronic device to be manufactured, and can, for example, be produced from plastic or glass.

In addition to electromagnetic radiation in the visible spectral range, the term "light" also includes electromagnetic radiation in the infrared or ultraviolet spectral range.

The mounting structure may comprise a holder into which the light guide can be inserted, in particular obliquely or perpendicular to the longitudinal axis of the light guide. The holder is used in particular for the mechanically stable mounting of the light guide, especially stable relative to a light-emitting component that emits light to be coupled into the light guide. For example, the holder is intended for a form-locking or force-locking connection of the light guide in the holder, for example, for a clamp connection or a snap connection. For example, part of the holder is temporarily deflected when the light guide is inserted.

Alternatively or additionally, a material-locking connection is also possible. In a material-locking connection, the prefabricated connection partners are held together by atomic and/or molecular forces. A material-locking connection can be achieved, for example, by a bonding agent such as an adhesive or a solder. Generally, disconnection of the connection is accompanied by destruction of the bonding agent and/or at least one of the connection partners.

For example, the holder is designed such that the light guide can be inserted with a defined insertion force, for example, 0.05 N to 1 N. In particular, the used light guide can only be removed when at least applying a minimum force such as 0.1 N to 10 N.

For example, the minimum force is greater than the insertion force. Alternatively or additionally, the directions of force for insertion and removal can run obliquely, i.e., not parallel, to each other and/or the insertion and removal can take place at different points of force application on the holder.

A spatial extension of the holder is particularly adapted to a cross section of the light guide to be inserted. For example, the holder along the longitudinal axis of the light guide is at least as long as the cross-section of the light guide. For example, the holder is at least as long as a housing of an associated light-emitting component. For example, the holder is at most 10 times as long as the housing of the associated light-emitting component.

The holder can also have a substructure with two or more holding elements such as clamps. Preferably, the holder with the substructure is formed from one-piece and/or made of the same base material.

The mounting structure may be configured to provide an optical coupling to the core of the light guide. In particular, the optical coupling takes place on a side surface of the light guide. In other words, the mounting structure is designed such that it forms a coupling region to the core of the light guide when the light guide is inserted or after it has been inserted. In other words, the coupling region is a region of the light guide in which the waveguiding of the core is disturbed. Compared to an adjacent region of the light guide, this coupling region allows an increased coupling into the core of the light guide.

In at least one example of the mounting structure for a light guide with a core and a longitudinal axis, the mounting structure comprises a holder into which the light guide is insertable obliquely or perpendicular to the longitudinal axis. The mounting structure is configured to provide an optical coupling to the core of the light guide.

By the holder, a secure hold of the light guide and a deterministic positioning of the light guide in relation to an associated light-emitting component can be realized simply and reliably.

The mounting structure may comprise a processing structure, wherein the processing structure is configured to locally modify the light guide with respect to its light coupling into the core when it is inserted into the holder. In other words, a coupling region is created via which light can be coupled into the light guide from the side, i.e., not via the ends.

In particular, the processing structure is designed for irreversible mechanical processing of the light guide, for example, by cutting, scribing or scraping. In other words, the processing structure forms the coupling region by mechanical stress of the light guide on the light guide. For example, the processing structure in conjunction with the holder exerts a force on the light guide during insertion and positioning of the light guide in the mounting structure. The processing structure, for example, is formed in one piece with the holder.

Alternatively or additionally, the processing structure is designed to change the light coupling locally by a material application, for example, by applying a medium such as a translucent medium or a dye.

The processing structure may be configured to remove an opaque insulation of the light guide in places when the light guide is inserted into the holder and to form a stripped region of the light guide. For example, the light guide is temporarily pressed against the processing structure when it is inserted into the mounting structure.

The processing structure may be designed such that it is spaced from the stripped region after the light guide has been completely inserted into the mounting structure. This simplifies light coupling into the light guide via the stripped region.

The holder may have an insertion opening into which the light guide can be inserted, wherein the insertion opening is smaller than a diameter of the light guide to be inserted at at least one point before mounting the light guide. In particular, the insertion opening is so small compared to the diameter of the light guide to be inserted that the light guide is processed during insertion. For example, material of the light guide is removed in places. For example, the processing structure forms part of the insertion opening. For example, a part of the holder is temporarily deflected when the light guide is inserted and the processing structure is located on a side of the insertion opening opposite this part.

Alternatively or additionally, the processing structure is movably mounted. For example, the processing structure is arranged on a sprung bracket and the bracket is compressed when the light guide is inserted.

The mounting structure may comprise a light coupling structure via which light can be coupled into the inserted light guide. For example, the light coupling structure directly adjoins the core of the inserted light guide.

For example, the light coupling structure is reflective. For example, the light coupling structure is designed as an area that reflects the incident light in a directional manner. Alternatively, the light coupling structure is diffusely reflective, for example.

Furthermore, the light coupling structure can be light-transmissive, for example.

The light coupling structure may be, for example, spectrally and/or spatially selective with respect to the incident light. This means that a larger percentage of certain parts of the incident light is coupled into the light guide than of other parts. For example, the light coupling structure has a higher reflectivity for one part of the incident light than for another part.

The mounting structure may be formed in one piece. In particular, the mounting structure can be formed from a metal sheet. For example, the mounting structure is designed such that it can be produced from a flat metal sheet, particularly only by forming processes and cutting processes.

Alternatively, however, the mounting structure can also have a plastic body or glass body or can be formed in one piece from a plastic body or glass body.

The mounting structure may be configured to be disposed on a housing of a light-emitting component. The mounting structure is therefore a separate element for fixed mounting of the light guide relative to the light-emitting component. The mounting structure may be spaced from the housing or may adjoin the housing.

The mounting structure can be particularly suitable for a variety of different housing types.

Furthermore, a housing of a light-emitting component is specified, wherein the housing has a mounting structure. In particular, the mounting structure has one or more of the above mentioned features.

The mounting structure is thus integrated into the housing of the component. For example, the housing has a housing body such as a plastic molded body. Furthermore, the housing can have a lead frame configured for the external electrical contacting of the light-emitting component.

In the housing, the mounting structure may be formed as a part of the lead frame. The mounting structure can also be a part of the lead frame that is electrically insulated from the current-carrying parts of the lead frame.

Alternatively, at least part of the mounting structure can be formed in one piece with a housing body of the component or can be attached to the housing body.

We also provide an optoelectronic device with at least two light-emitting components intended for light generation and a light guide. For example, each light-emitting component is assigned a mounting structure, for example, as part of the light-emitting component or separately from the light-emitting component. This mounting structure can be designed as described above. The light guide is inserted into the mounting structures so that during operation of the optoelectronic device, part of the light generated by the light-emitting components is coupled into the light guide. In particular, the light is coupled into the light guide via a lateral coupling region.

It is appropriate to couple only a small proportion of the light emitted by the components into the associated coupling region such as at most 10%, in particular 0.001% to 1%, for example, 0.01% to 0.1%.

The optoelectronic device may comprise a detector, wherein light emerging from the light guide at least partially impinges on the detector. In particular, the light impinging on the detector exits from one end of the light guide.

For example, the detector is configured such that a signal from the detector is fed to a control device. The light-emitting components can be controlled by the control device, in particular as a function of the detector signal. For example, the control device controls at least one operating quantity of the light-emitting components, for example, a strength or a duty rate of an operating current.

The optoelectronic device may comprise a medium in the region of each mounting structure that modifies a light coupling into the light guide.

For example, the medium is a translucent medium that directly adjoins the core of the light guide and produces a light coupling into the light guide. For example, the translucent medium is a gel that reduces the refractive index difference locally at an interface to the core of the light guide and thus forms a coupling region of the light guide.

In the optoelectronic device, the mounting structures may each comprise a deflection device that covers the associated light-emitting component in places in plan view of the optoelectronic device. The part of the light emitted by the associated light-emitting component and coupled into the light guide can be increased via the deflection device. The efficiency of the coupling can therefore be increased. Alternatively or additionally, the spatial and/or spectral distribution of the light to be coupled in can be adjusted by the deflection device. The deflection device can also be designed to shield the coupling region from the light of the other light-emitting components. For example, a maximum lateral extension of the deflection device is at most ten times or at most five times the diameter of the light guide.

We further provide a method of producing an optoelectronic device.

In the method, at least two light-emitting components may be provided, wherein each light-emitting component may be assigned a mounting structure for a light guide with a core, wherein the mounting structure has a holder. The light guide is inserted into the holders of the mounting structures and an optical coupling to the core of the light guide is established in the region of the mounting structures.

For example, each light-emitting component or each group of light-emitting components of the optoelectronic device is assigned exactly one mounting structure.

The optical coupling may take place when the especially flexible light guide is inserted into the holders. The points at which light is coupled into the light guide are thus formed when it is inserted into the mounting structures. If the set-up of the optoelectronic device is changed, for example, if the number or position of the light-emitting components is changed, the light guide itself does not necessarily have to be modified. It is not necessary to adapt the light guide, as would be necessary, for example, with a rigid light guide specifically matched to the optoelectronic device.

The optical coupling may only be produced after the light guide has been inserted into the holders. This can be done, for example, by a particularly translucent medium applied in the region of the mounting structure.

The light-emitting components and the associated mounting structures may be fastened to a connection carrier in a common manufacturing step. The mounting structures can be manufactured separately from the light-emitting components or integrated into the light-emitting components.

The mounting structures and the associated light-emitting components may be fastened to the connection carrier by a soldering process, for example, by reflow soldering, in particular to spaced-apart connection areas of the connection carrier. For example, the connection carrier has a separate connection area for each mounting structure spaced from the connection areas(s) of the light-emitting component. During soldering, the light-emitting components and the associated mounting structures can adjust relative to each other floating on the liquid solder. This allows an easily reproducible relative arrangement between component and associated mounting structure. Alternatively, it is possible, for example, that the mounting structure has a stop that adjoins the light-emitting component during mounting.

The method is particularly suitable for the production of an optoelectronic device described above. A mounting structure described above is particularly suitable for the process. Features described in connection with the optoelectronic device and in particular with the mounting structure can therefore also be used for the method and vice versa.

In particular, the following effects can be achieved with the features described.

By the mounting structure, an optical coupling of a light guide can be achieved in a simple and reproducible way. In particular, the light guide can be reliably attached in precisely defined geometric conditions to the light-emitting components. The light guide is mechanically supported and at the same time a defined coupling into the light guide can take place. Even in a device with a large number of light-emitting components, it can be achieved in a simplified manner that all light-emitting components or groups formed from them, if applicable, cause a comparably high light input to the detector. In particular, a single detector is also sufficient for a large number of light-emitting components. The use of several detectors and thus the risk of a falsified control due to slightly different detector properties can be avoided.

Furthermore, structural changes to the device to be produced such as a change in the number or relative position of the light-emitting components, do not require any complex modification of the light supply to the detector.

The mounting structure can be formed separately and in particular independently of the light-emitting components used so that it can also be used for different component types or housing shapes.

Alternatively, the mounting structure can be integrated into the light-emitting components. This eliminates the need to position the mounting structures relative to the associated light-emitting components when producing an optoelectronic device.

Furthermore, the mounting structure can be designed such that it processes or at least prepares the light guide for light coupling during mounting.

Further advantages and expediencies result from the following description of the examples in connection with the figures.

Identical, similar or similar acting elements are provided with the same reference signs in the figures. The figures are schematic representations and therefore not necessarily to scale. Rather, comparatively small elements and, in particular, layer thicknesses can be displayed excessively large for illustration purposes.

Figure 1A:
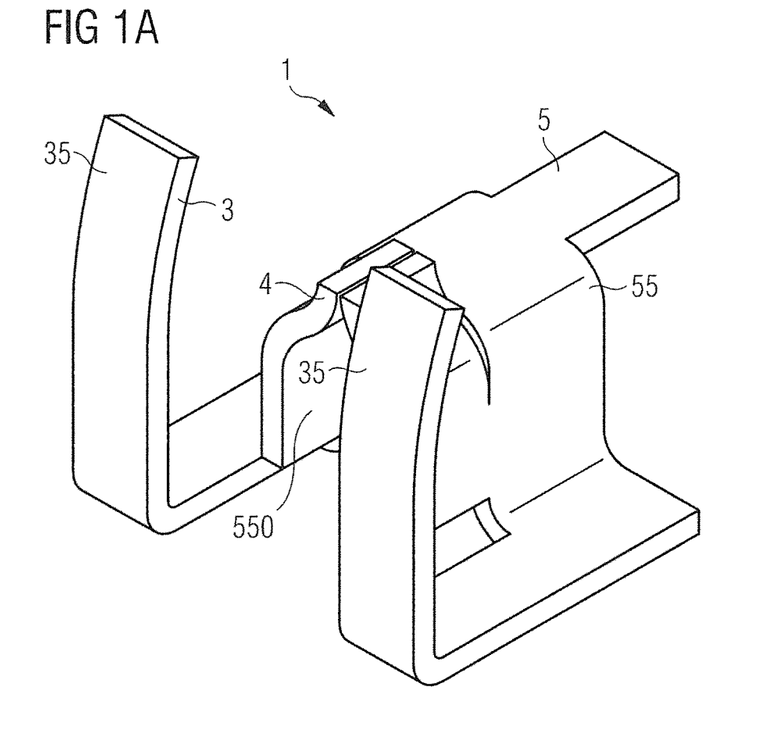
FIGS. 1A to 1G show an example of a mounting structure in perspective view (FIG. 1A), in side view (FIG. 1B), in perspective view with an associated light-emitting component (FIG. 1C), in perspective view with a light guide (FIG. 1D) and in schematic side view in FIGS. 1E, 1F and 1G, wherein the figures illustrate different stages of inserting a light guide into the mounting structure.
Figure 1B:
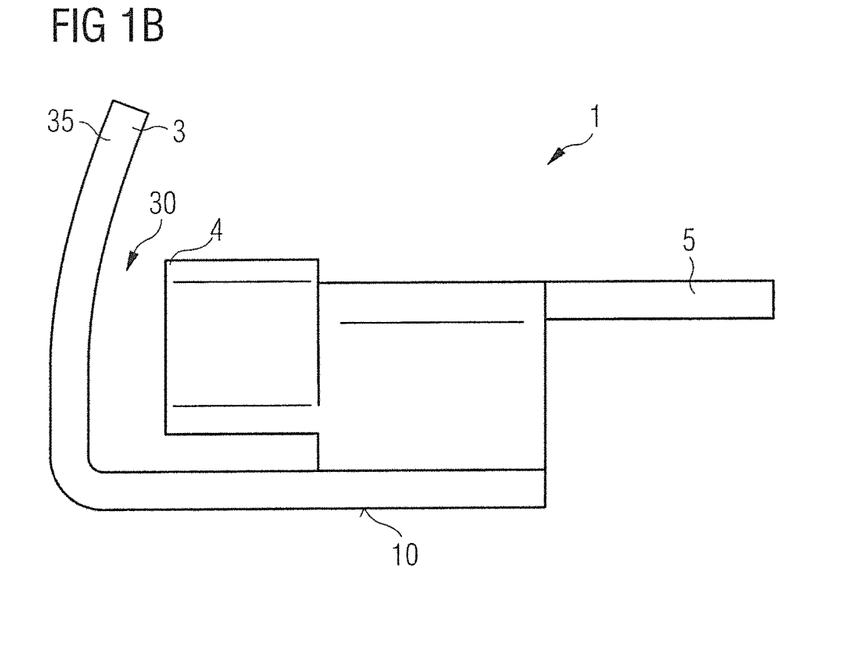
Figure 1C:
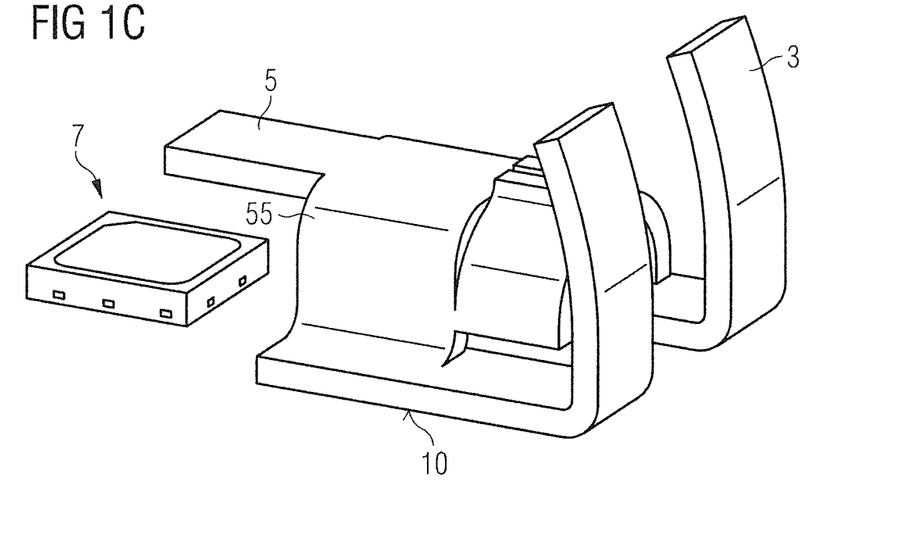
Figure 1D:
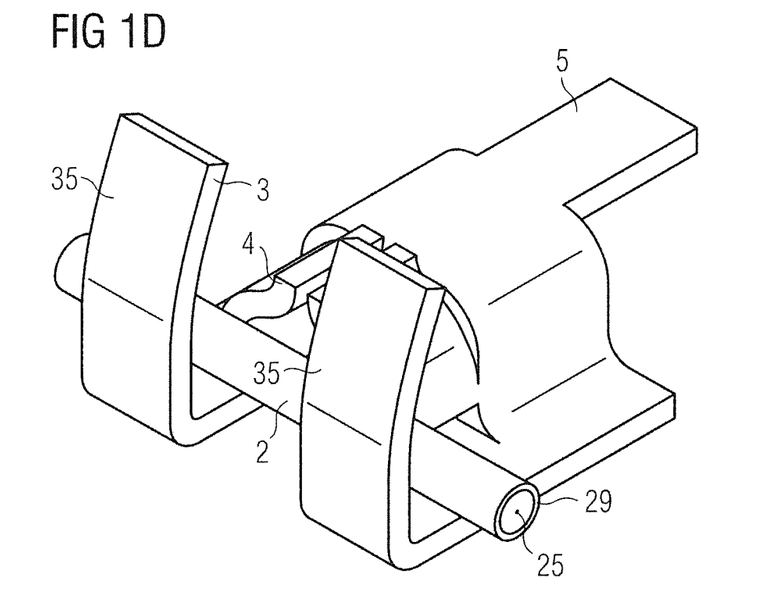

An example of a mounting structure 1 is shown in FIG. 1 in perspective view, wherein, for the purpose of illustration, the arrangement relative to an associated light-emitting component 7 is shown in FIG. 1C and relative to a light guide 2 is shown in FIG. 1D, respectively.

The mounting structure 1 is shown here as an example for when the light guide 2 has a core 20, a longitudinal axis 25 and an opaque insulation 29 surrounding the core.

The mounting structure 1 has a holder 3 into which the light guide can be inserted perpendicular to the longitudinal axis. The holder is exemplarily formed by two clamps 35 that run parallel to each other. An insertion opening 30 is formed between the holder 3 and a processing structure 4. A minimum cross section of the insertion opening 30 is smaller than the diameter of the light guide to be inserted into the mounting structure so that the light guide is mechanically processed by the processing structure 4 when inserted into the mounting structure 1. This is explained in more detail in FIGS. 1E to 1G.

Figure 1E:
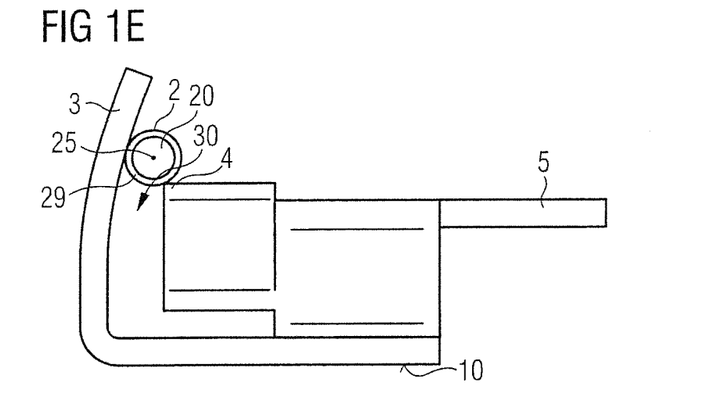

When a force is applied to the light guide 2 perpendicular or substantially perpendicular to a mounting surface 10 of the mounting structure, the clamps 35 of the holder 3 are temporarily deflected and the processing structure 4 comes into mechanical contact with the insulation 29 of the light guide 2.

Figure 1F:
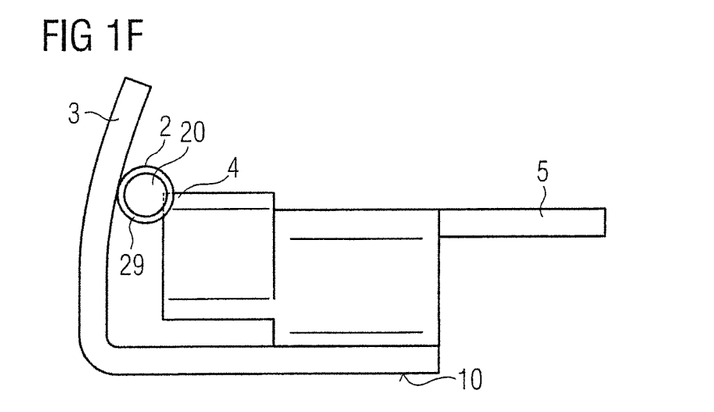
Figure 1G:
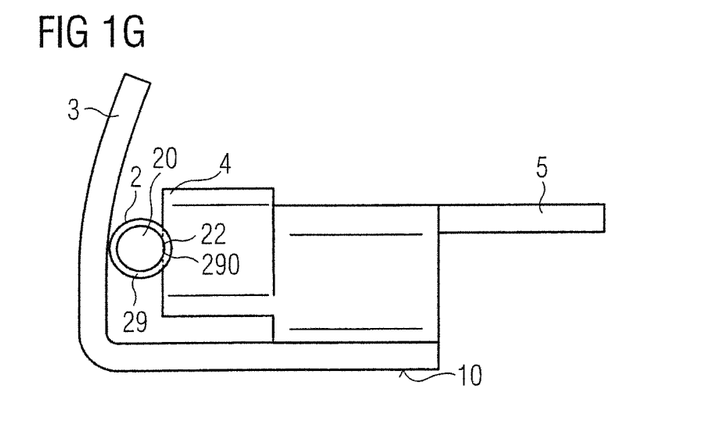

The processing structure 4 acts as a cutting edge and removes part of the insulation 29 as shown in FIG. 1F, during the light guide 2 passes through the insertion opening 30. As shown in FIG. 1G, a stripped region 290 of the light guide 2 is formed in this way. The stripped region 290 forms a coupling region 22 in the light guide 2. Thus, the light guide has a lateral coupling region.

When the light guide 2 is completely inserted into the holder 3, the processing structure 4 is spaced from the coupling region 22 so that light from a light-emitting component 7 assigned to the mounting structure (see FIG. 1C) can be coupled into the light guide 2 via the coupling region 22 and can be guided along the longitudinal axis 25 of the light guide. The coupling region 22 is arranged at a smaller distance from the mounting surface 10 than the processing structure 4.

The mounting structure 1 also has a deflection device 5. The deflection device 5 is foreseen to increase the coupling of the radiation generated by the light-emitting component 7 into the coupling region 22. The deflection device 5 covers the light-emitting component 7 in a plan view of the light-emitting component in places, in particular only in places. In this way some of the emitted light is deflected in the direction of the coupling region 22. The light is reflected at the deflection device and runs within a shielding region 55 of the mounting structure 1 in a light propagation region 550 in the direction of the coupling region. The light propagation region 550 is expediently adapted to the lateral extent of the coupling region 22 in the light guide 2 so that the light arrives at the light guide in a suitable spatial distribution and a maximum coupling efficiency to the light guide can be achieved. For example, an extension of the light propagation region along the longitudinal axis of the light guide is 1 mm to 5 mm.

The shielding region 55 can also be used to reduce the amount of light that comes from a component other than the associated light-emitting component or from the environment and that enters the coupling region 22 of the light guide.

The mounting structure 1 thus produces a well reproducible, fixed and precisely defined arrangement of the light guide and in particular of the coupling region 22 of the light guide in relation to the associated light-emitting component 7. The coupling region of the light guide 2 is produced when the light guide is inserted into the holder 3 so that a pre-assembled, commercially inexpensively available light guide can be used.

The mounting structure 1 may be formed in one piece, apart from any local coatings that may be present. In particular, the mounting structure 1 may be designed such that it can be formed from a flat sheet in its manufacture, for example, by punching processes and forming processes such as bending, embossing or deep drawing. Cost-effective production is thus simplified.

For example, a force of 0.05 N to 1 N is required to insert the light guide into the mounting structure 1. Higher forces are preferably required to remove the light guide, for example, 0.1 N to 10 N.

The mounting structure 1 is designed, for example, such that a maximum of 10%, in particular typically 0.01% to 0.1%, of the radiation emitted by the light-emitting component, is coupled into the light guide 2. For example, a lateral expansion of the mounting structure is 0.5 times to 10 times the maximum lateral expansion of the associated light-emitting component 7.

In the example shown, the processing structure 4 effects mechanical processing of the light guide, for example, by cutting, scribing or scraping. Alternatively or additionally, the processing structure can be designed such that it applies a medium such as a translucent medium or a dye, locally to the light guide and thus modifies the light coupling into the light guide (see FIG. 4C).

The mounting structure 1 with the holder 3 and the processing structure 4 and in particular, if applicable, with the deflection device 5, may be formed in one piece and may be made of metal, for example. However, other materials such as plastic or glass, may also be used for one of the above elements or the entire mounting structure.

The processing structure is particularly active when the light guide is inserted into the mounting structure 1 so that no further processing step is required in addition to inserting the light guide 2 into the mounting structure. In particular, the light guide does not have to be adapted to the geometry of the optoelectronic device to be produced before it is inserted.

The coupling region 22 of the light guide 2 formed by the processing structure 4 is positioned such that the coupling region 22 faces the light propagation region 550 of the mounting structure.

FIGS. 2A to 2F show an example of a mounting structure that is part of a housing 70 of a light-emitting component 7.

The housing 70 has a housing body 71 and a lead frame 72, wherein the housing body 71 is formed around the lead frame 72 and the housing body is formed on the lead frame. At the points where the housing body is formed on the lead frame, the housing body directly adjoins the lead frame. The lead frame 72 is designed for the external electrical contacting of a semiconductor chip of a light-emitting component 7 arranged in the housing 70. In the view shown in FIG. 2B, the semiconductor chip is covered by an envelope 73 and therefore not visible in the figure.

Figure 2A:
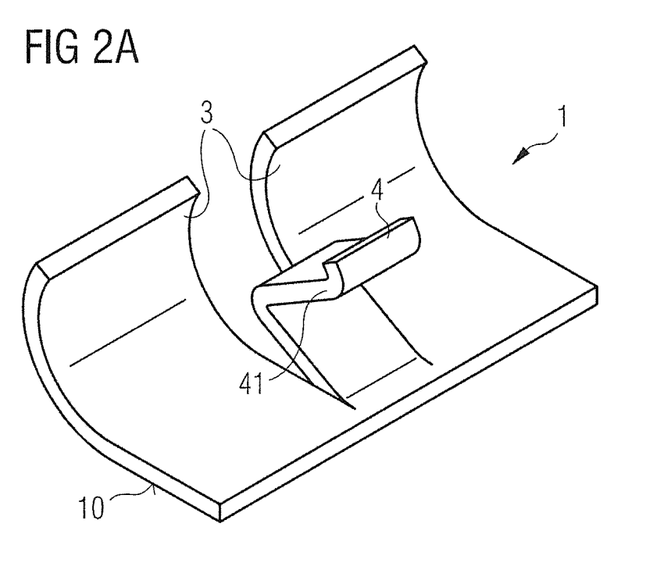
FIG. 2A shows a perspective view of the mounting structure, FIG. 2B a perspective view of a light-emitting component with such a mounting structure and FIG. 2C a view with inserted light guide into the component of FIG. 2B and the FIGS. 2D to 2F each illustrate in side views of the housing in different stages of the introduction of a light guide into the mounting structure.
Figure 2B:
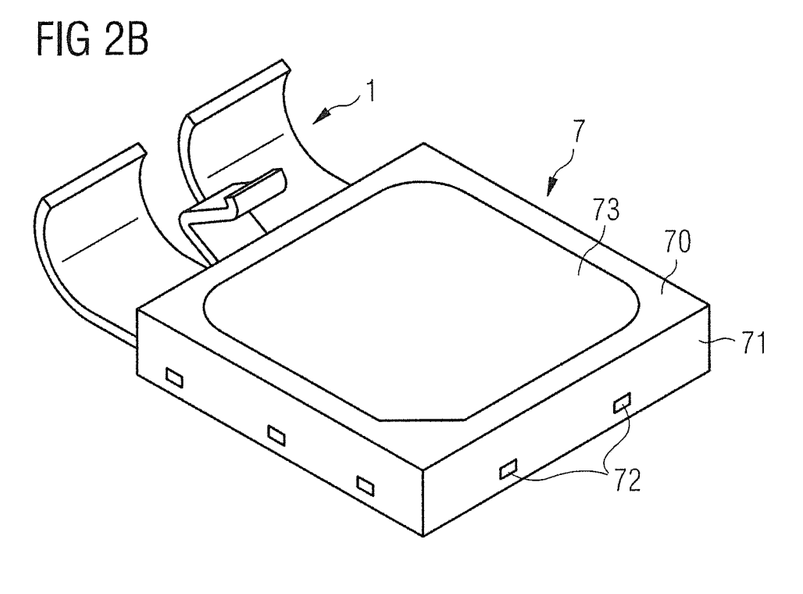
Figure 2C:
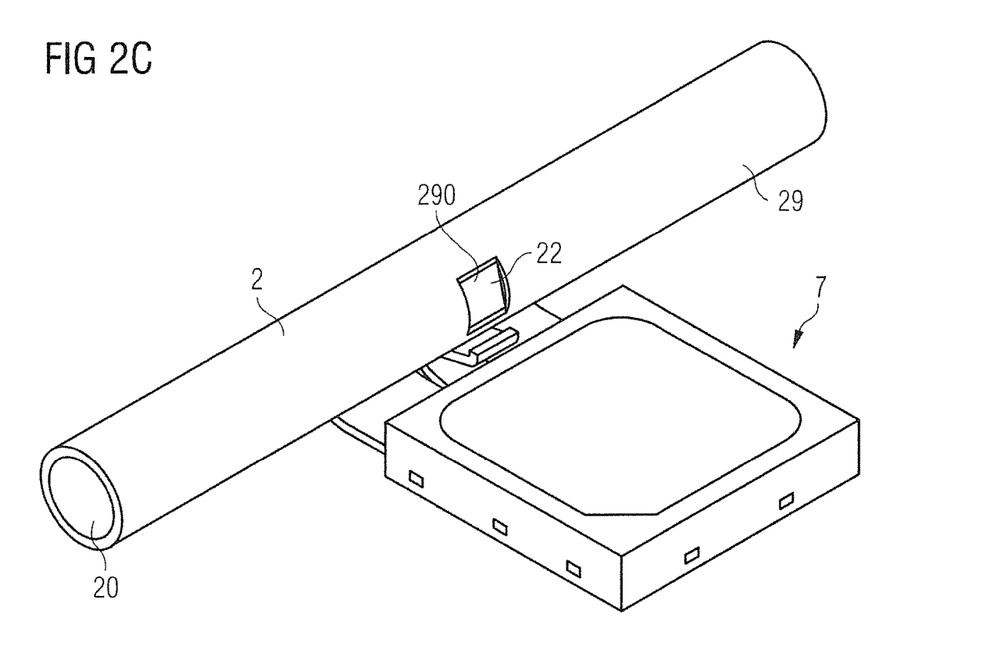

The mounting structure 1 shown separately in FIG. 2A is part of the housing 70, in particular part of the lead frame 72. The mounting structure is thus integrated into the housing of the light-emitting component 7. The mounting structure may be spaced from the parts of the lead frame 72 used for external electrical contacting of the housing or may be formed in one piece with a part used for electrical contacting.

Figure 2D:
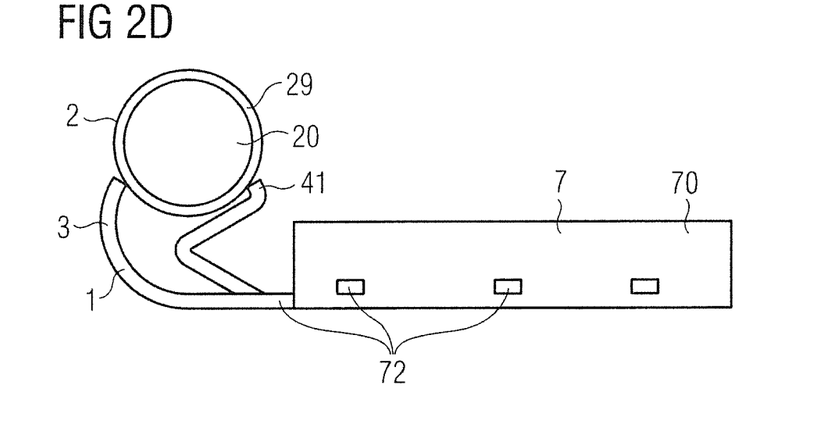
Figure 2E:
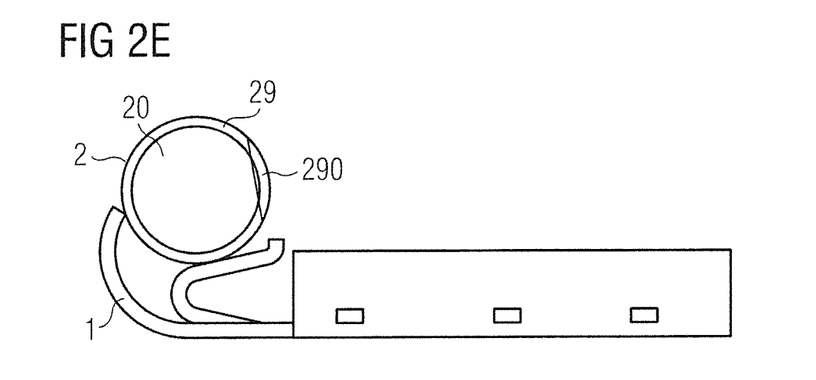
Figure 2F:
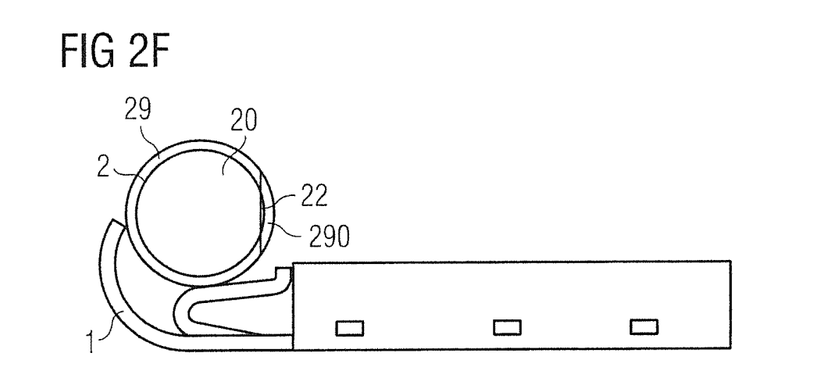

The mounting structure 1, in turn, has a holder 3 and a processing structure 4. In this example, the processing structure 4 is formed by the end of a bracket 41. When inserting the light guide 2, this bracket is compressed in the direction of the mounting surface 10 as shown in FIGS. 2D to 2F. The processing structure 4 removes part of insulation 29 of the light guide 2 so that a stripped region 290 forms a coupling region 22 of the light guide as described in connection with FIGS. 1E to 1G. When the light guide is inserted, the coupling region is located at a greater distance from the mounting surface 10 than the processing structure 4.

In the production of housing 70, the mounting structure 1 can be produced using the same processes that are used to form the lead frame from a flat sheet. In particular, the entire mounting structure can be formed of a single contiguous part of the lead frame. The mounting structure can thus be integrated into the housing particularly cost-effectively. In deviation from this, the mounting structure can also be designed as part of the housing body 71.

FIGS. 3A to 3F show another example of a mounting structure. This example essentially corresponds to the example described in connection with FIGS. 1A to 1G.

Figure 3A:
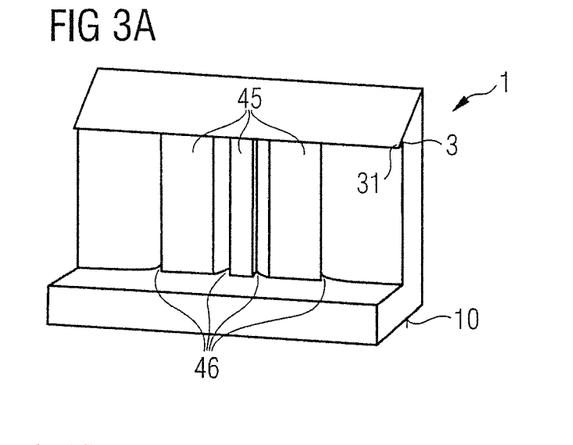
FIGS. 3A to 3F show an example of a mounting structure in perspective view (FIG. 3A) in perspective view with an associated light-emitting component (FIG. 3B), in perspective view with an inserted light guide (FIG. 3C) and based on simulations of the beam path, wherein FIG. 3D corresponds to FIG. 3B, FIG. 3E correspond to FIG. 3C and FIG. 3F corresponds to a rotated view of FIG. 3C.
Figure 3B:
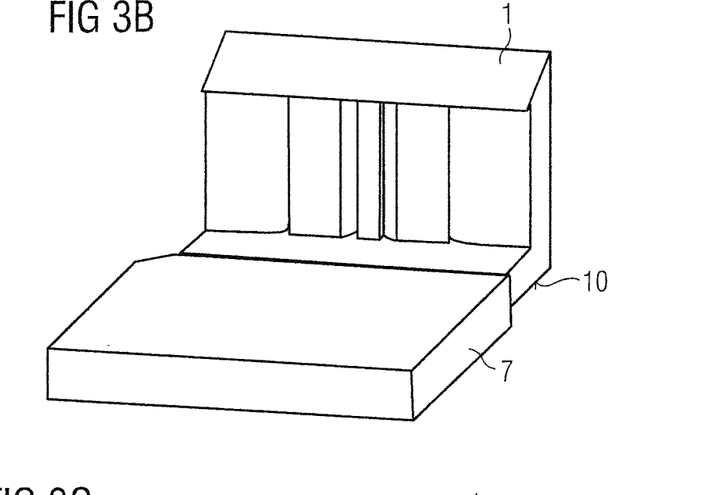
Figure 3C:
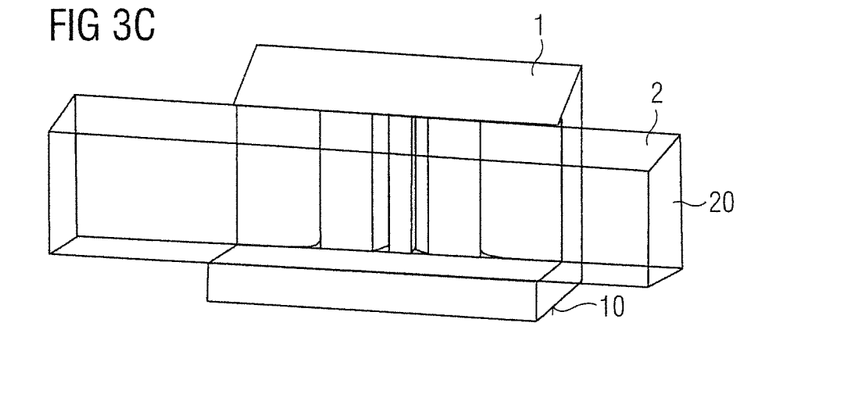

In contrast to this, the mounting structure 1 is intended for the insertion of a light guide 2 which has no insulation. For example, the light guide 2 is a flexible or rigid plastic body with a rectangular or square cross-section.

The mounting structure 1 can be designed separately from a housing of a light-emitting component or as part of such a housing.

The mounting structure 1 has a holder 3, wherein the holder 3 is formed by a projection 31 into which the light guide 2 can snap when inserted into the mounting structure. Furthermore, the mounting structure 1 has a light coupling structure 45.

For the mounting structure 1, for example, a base body made of a plastic such as a silicone, a glass or a metal is suitable, wherein partial regions of the base body may have different reflection-increasing or reflection-inhibiting coatings.

The light coupling structure 45 is exemplarily formed by three planar regions between each of which a set-back region 46 is formed. When a light guide 2 is inserted, the light guide 2 directly adjoins the light coupling structure 45 and remains at a distance from the set-back regions 46. The set-back regions are exemplarily designed with a curved surface.

The light coupling structure 45, for example, can be formed by directionally or diffusely reflecting surfaces, for example, by a reflective metallic or diffusely reflecting coating. A spatial selectivity of the coupling can be achieved, for example, through different surface properties such as different roughnesses or differently strong diffuse properties.

Of course, the geometric design of the light coupling structure 45 with three strips running perpendicular to the mounting surface 10 is only exemplary and can be varied within further limits as long as the light coupling structure causes the light of the associated light-emitting component to be coupled into the light guide and thus a light guide along the longitudinal axis of the light guide.

Alternatively or additionally, the light coupling structure 45 may also be spectrally selective, for example, if the light coupling structure more strongly spectrally reflects parts in one color range, for example, in the blue spectral range, than in another spectral range, for example, in the red, yellow and/or green spectral range.

In this example, the light generated by the associated light-emitting component 7 initially passes through the light guide 2 perpendicular or essentially perpendicular to the longitudinal axis of the light guide and is coupled into the light guide at the light coupling structure 45.

Figure 3D:
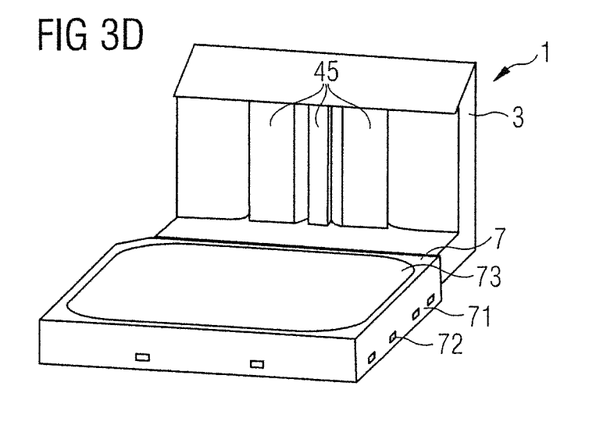
Figure 3E:
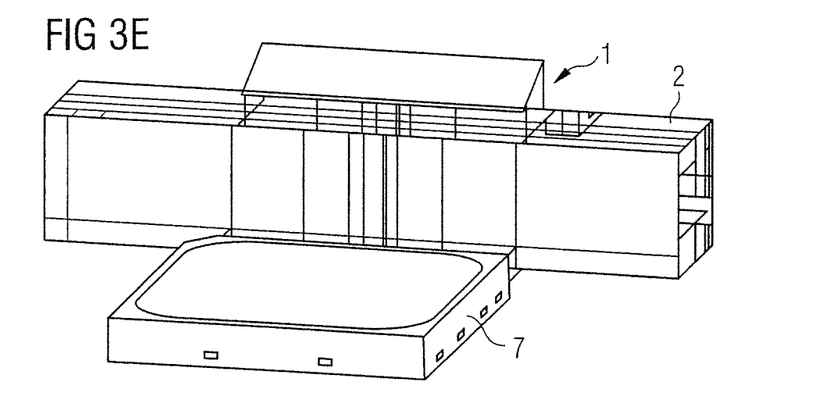
Figure 3F:
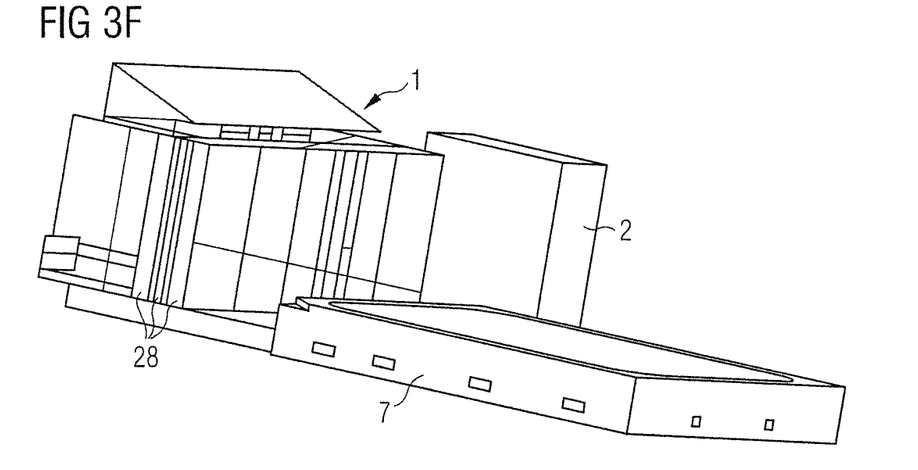

FIGS. 3D to 3F show simulation results that simulate the beam path of a light to be coupled in and a coupling into the light guide 2. In FIG. 3F, at an end face of the light guide 2 an image 28 of the light coupling structure 45 can be seen. These simulations prove that radiation of the light-emitting component can be coupled in spatially selectively and, if necessary, also spectrally selectively via the light coupling structure 45.

Figure 4A:
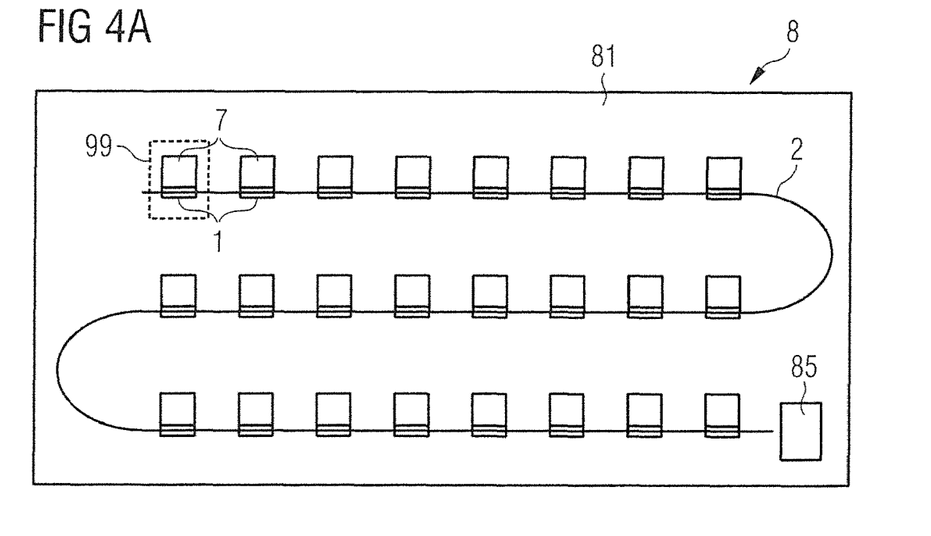
Figure 4B:
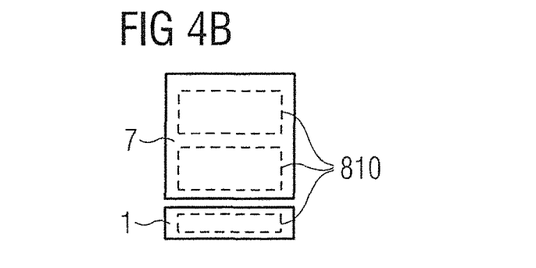
FIG. 4B shows an enlarged view of a section 99 shown in FIG. 4A.

An example for an optoelectronic device is shown in FIGS. 4A and 4B schematically in plan view. The optoelectronic device 8 has a plurality of light-emitting components 7. As an example, these are arranged in matrix form in three rows and eight columns. The light-emitting components 7 are each assigned a mounting structure 1 designed as described in connection with FIGS. 1A to 1G. The light-emitting components 7 and the associated mounting structures 1 are each arranged laterally spaced apart on a connection carrier 81 such as a printed circuit board.

As shown in FIG. 4B, the mounting structure 1 can be mounted on its own connection area 810, wherein this connection area is spaced from the connection area 810 for the light-emitting component 7. When mounting the mounting structures 1 and the light-emitting components 7 to the connection carrier 81 using a soldering process such as a reflow soldering process in a furnace, the light-emitting components 7 and the mounting structures 1 can each float on the corresponding solder and thus align to each other in a self-aligned manner. With the described mounting structure 1, a substantially equal light input into a common light guide 2 of the optoelectronic device can be achieved for all light-emitting components 7. Thus, all light emitting components 7, especially independent of their relative position to a detector 85, can contribute an equal amount to the signal of the detector 85.

The number of coupling regions and thus of the light-emitting components 7 that couple into a common light guide can be varied within a wide range. Complex optical arrangements with reflectors and apertures, for example, to generate an equivalent signal at the detector for all light-emitting components and the associated adjustment effort can be dispensed with.

In particular, all light-emitting components 7 can couple light into a common light guide 2. Deviating from this, it is also possible that more than one light guide, for example, one light guide per line or per column, could be used.

Figure 4C:
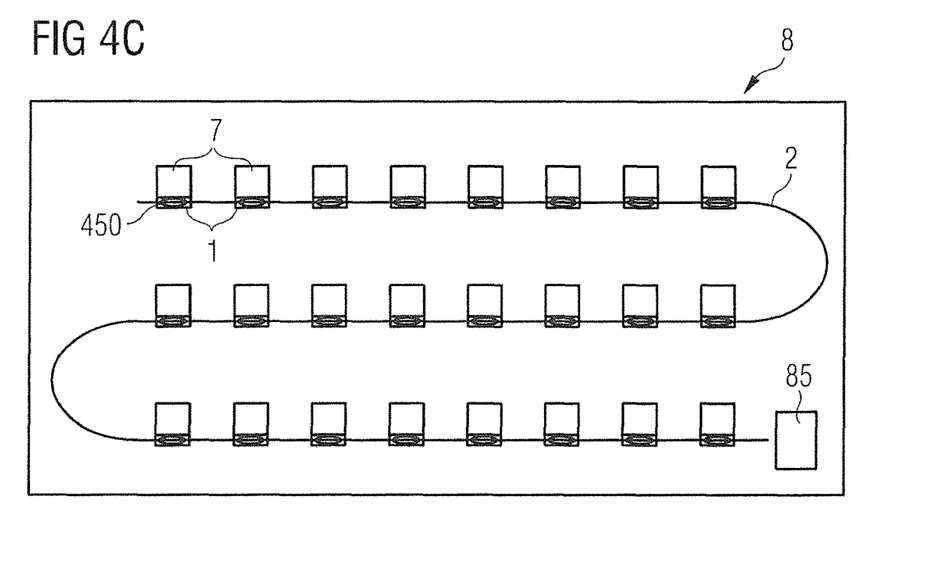
FIG. 4C shows an example of an optoelectronic device in schematic plan view.

The example shown in FIG. 4C essentially corresponds to the example described in connection with FIGS. 4A and 4B. In contrast to this, the device has a medium 450. For example, the medium is a translucent medium directly adjoining the core of the light guide and, by locally reducing the refractive index difference at an interface to the core of the light guide, causes light to be coupled into the light guide. For example, a gel is suitable as a translucent medium 450. Alternatively, another medium can also be used, for example, a reflective material or a dye that selectively spectrally reflects or transmits.

Figure 5A:
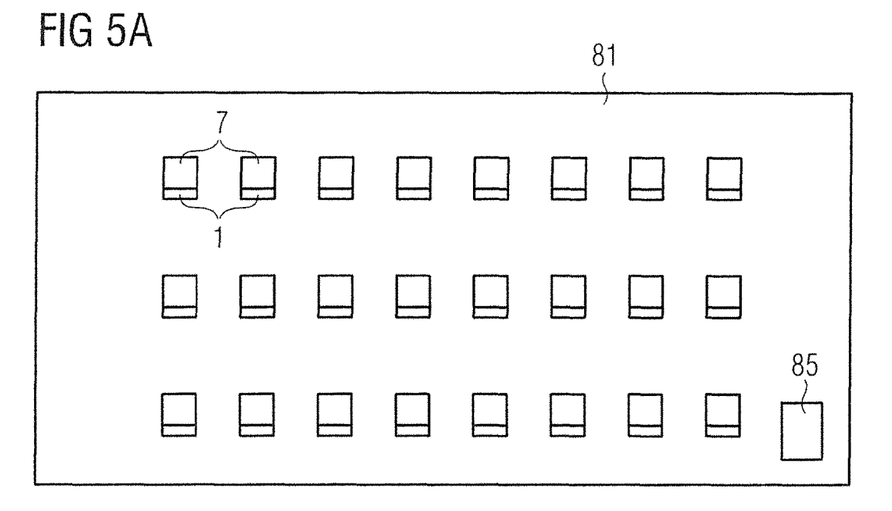
FIGS. 5A and 5B show an example of a method of producing an optoelectronic device using intermediate steps shown in schematic plan view.
Figure 5B:
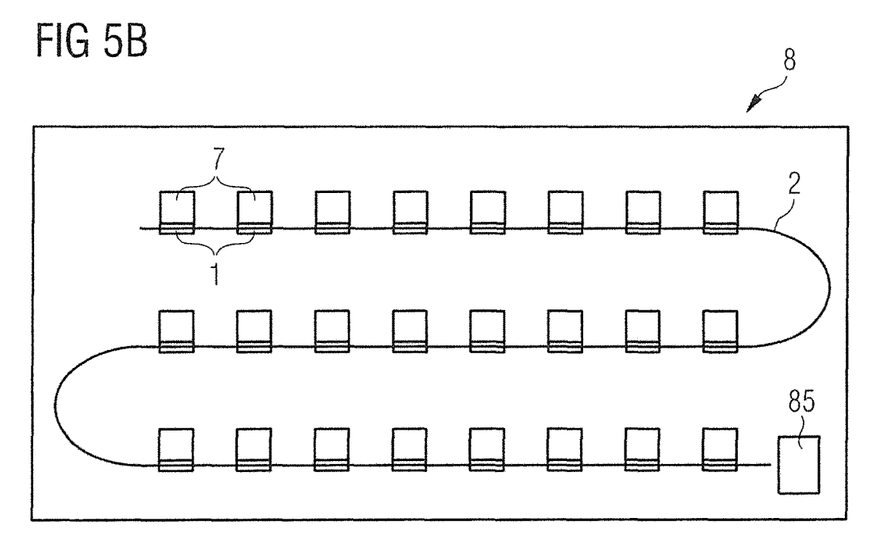

A method of producing an optoelectronic device is shown schematically in FIGS. 5A and 5B. A plurality of light-emitting components 7, each of which is assigned a mounting structure 1 for a light guide, is provided, for example, on a connection carrier 81.

The mounting structures can be separate from the light-emitting components as described in connection with FIGS. 1A to 1G or integrated in the housings of the light-emitting components (see FIGS. 2A to 2F). A light guide 2 is inserted into the holders of the mounting structures 1 and an optical coupling to the core of the light guide in the region of the mounting structures is established (FIG. 5B).

The optical coupling can take place especially during the light guide is inserted into the holders. This has already been explained in connection with FIGS. 1E to 1G and 2D to 2F. In contrast to this, the optical coupling can also only take place after the light guide 2 has been inserted into the holders, for example, by a medium which in places directly adjoins the core of the light guide (FIG. 4C).

This application claims priority of DE 10 2017 120 019.3, the subject matter of which is incorporated herein by reference.

Our mounting structures, housings, devices and methods are not limited by the description based on the examples. Rather, this disclosure includes each new feature and each combination of features, which includes in particular each combination of features in the appended claims, even if the feature or combination itself is not explicitly indicated in the claims or the examples.

The invention claimed is:

1. A light-emitting component comprising:
   a mounting structure for a light guide having a core and a longitudinal axis, wherein
   the mounting structure comprises a holder into which the light guide is insertable obliquely or perpendicular to the longitudinal axis,
   the mounting structure is configured to provide an optical coupling to the core of the light guide,
   the mounting structure comprises a processing structure configured to locally modify the light guide with respect to its light coupling into the core when inserted into the holder,
   the mounting structure comprises a light coupling structure via which light can be coupled into the core of the inserted light guide,
   the light coupling structure is reflective or diffusely reflective, and
   the light coupling structure is configured such that during operation of the light-emitting component with an inserted light guide, light generated by the light-emitting component initially passes through the light guide essentially perpendicular to the longitudinal axis of the light guide and is coupled into the light guide at the light coupling structure.

2. The light-emitting component according to claim 1, wherein the processing structure is configured to remove an opaque insulation of the light guide in places when the light guide is inserted into the holder and to fouli a stripped region of the light guide.

3. The light-emitting component according to claim 2, wherein the processing structure is spaced from the stripped region after the light guide has been completely inserted into the mounting structure.

4. The light-emitting component according to claim 1, wherein the light coupling structure directly adjoins the core.

5. The light-emitting component according to claim 4, wherein the light coupling structure is spectrally and/or spatially selective with respect to the incident light.

6. The light-emitting component according to claim 1, wherein the mounting structure is formed in one piece.

7. The light-emitting component according to claim 1, wherein the mounting structure is configured to be disposed on a housing of the light-emitting component.

8. A housing of a light-emitting component comprising the light-emitting component according to claim 1.

9. The housing according to claim 8, further comprising a housing body and a lead frame, wherein the lead frame is configured for external electrical contacting of the light-emitting component, and the mounting structure is formed as a part of the lead frame.

10. An optoelectronic device with at least two light-emitting components, a detector and a light guide having a core and a longitudinal axis, wherein
the light-emitting components are each assigned the light-emitting component according to claim 1,
the light guide is inserted into the mounting structures so that during operation of the optoelectronic device a part of at most 10% of the light generated by the light-emitting components is coupled into the light guide in each case, and
light emerging from the light guide at least partially impinges on the detector.

11. The optoelectronic device according to claim 10, wherein, in the region of each mounting structure, the optoelectronic device comprises a medium that modifies a light coupling into the light guide.

12. The optoelectronic device according to claim 10, wherein the mounting structures each have a deflection device that covers the associated light-emitting component in places in plan view of the optoelectronic device.

13. A light-emitting component comprising:
a housing with a lead frame, and
a mounting structure for a light guide having a core and a longitudinal axis, wherein
the mounting structure comprises a holder into which the light guide is insertable obliquely or perpendicular to the longitudinal axis,
the mounting structure is configured to provide an optical coupling to the core of the light guide,
the lead frame is configured for external electrical contacting of the light-emitting component, and
the mounting structure is formed as a part of the lead frame.

14. A method of producing an optoelectronic device comprising:
a) providing at least two light-emitting components, each of which comprise
a housing with a lead frame, and
a mounting structure for a light guide having a core and a longitudinal axis, wherein
the mounting structure comprises a holder into which the light guide is insertable obliquely or perpendicular to the longitudinal axis,
the mounting structure is configured to provide an optical coupling to the core of the light guide,
the lead frame is configured for external electrical contacting, of the light-emitting component, and
the mounting structure is formed as a part of the lead frame;
b) inserting the light guide into the holders of the mounting structures; and
c) establishing an optical coupling to the core of the light guide in the region of the mounting structures.

15. The method according to claim 14, wherein the optical coupling takes place when the light guide is inserted into the holders.

16. The method according to claim 14, wherein the light-emitting components and the associated mounting structures are fastened on a connection carrier in a common manufacturing step.

17. The method according to claim 16, wherein the mounting structures and the associated light-emitting components are each fastened to spaced-apart connection areas of the connection carrier by a soldering process.

\* \* \* \* \*

UNITED STATES PATENT AND TRADEMARK OFFICE
CERTIFICATE OF CORRECTION

PATENT NO. : 10,444,437 B2
APPLICATION NO. : 16/114921
DATED : October 15, 2019
INVENTOR(S) : Lorenz et al.

Page 1 of 1

It is certified that error appears in the above-identified patent and that said Letters Patent is hereby corrected as shown below:

In the Claims

At Column 13, at Line 9, please change "fouli" to --formed--.

Signed and Sealed this
Twenty-fourth Day of December, 2019

Andrei Iancu
*Director of the United States Patent and Trademark Office*